United States Patent [19]

Katz

[11] 3,990,912
[45] Nov. 9, 1976

[54] ELECTROLYTE REGENERATION IN A FUEL CELL STACK

[75] Inventor: Murray Katz, Newington, Conn.

[73] Assignee: United Technologies Corporation, Hartford, Conn.

[22] Filed: June 13, 1974

[21] Appl. No.: 479,011

Related U.S. Application Data

[63] Continuation of Ser. No. 272,501, July 17, 1972, abandoned.

[52] U.S. Cl. .................................. 429/14; 429/34
[51] Int. Cl.² ............................................ H01M 8/18
[58] Field of Search .............. 136/86 C, 86 R, 86 E

[56] References Cited
UNITED STATES PATENTS

| | | | |
|---|---|---|---|
| 3,331,703 | 7/1967 | Young | 136/86 C |
| 3,511,712 | 5/1970 | Giner | 136/86 R |
| 3,692,649 | 9/1972 | Prigent et al. | 136/86 R |

Primary Examiner—John H. Mack
Assistant Examiner—H. A. Feeley
Attorney, Agent, or Firm—Stephen E. Revis

[57] ABSTRACT

In a fuel cell stack utilizing an alkali metal electrolyte, the electrolyte is distributed in parallel between the electrodes of a plurality of fuel cells and is then fed to regenerator cell which converts carbonate ions to molecular $CO_2$ gas which is discharged from the cell. Regeneration is effected through the establishment of a hydroxyl ion gradient within a regenerator cell. The regenerated electrolyte is then returned to the fuel cells. In this manner a carbonate buildup in the cells is prevented.

9 Claims, 4 Drawing Figures

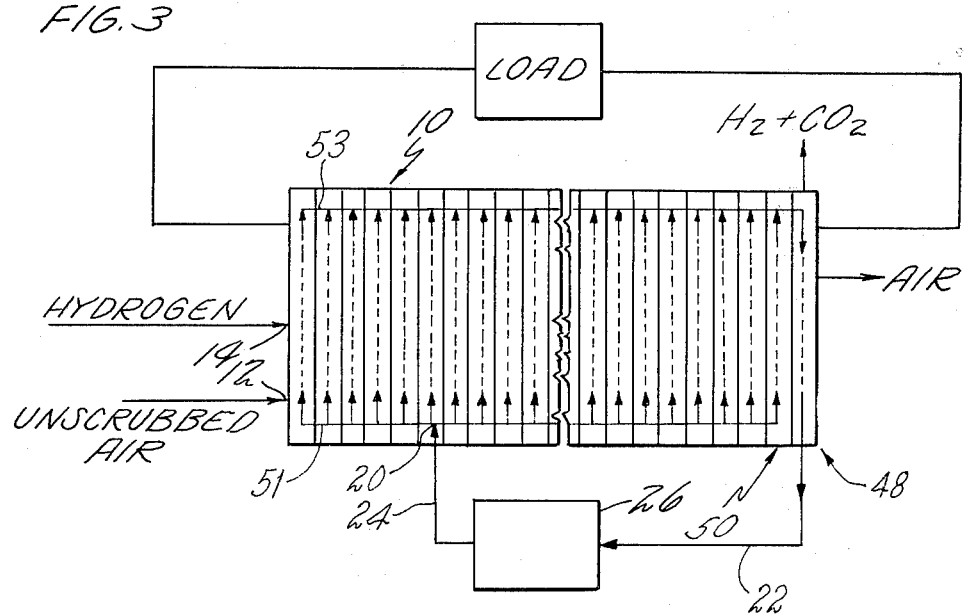
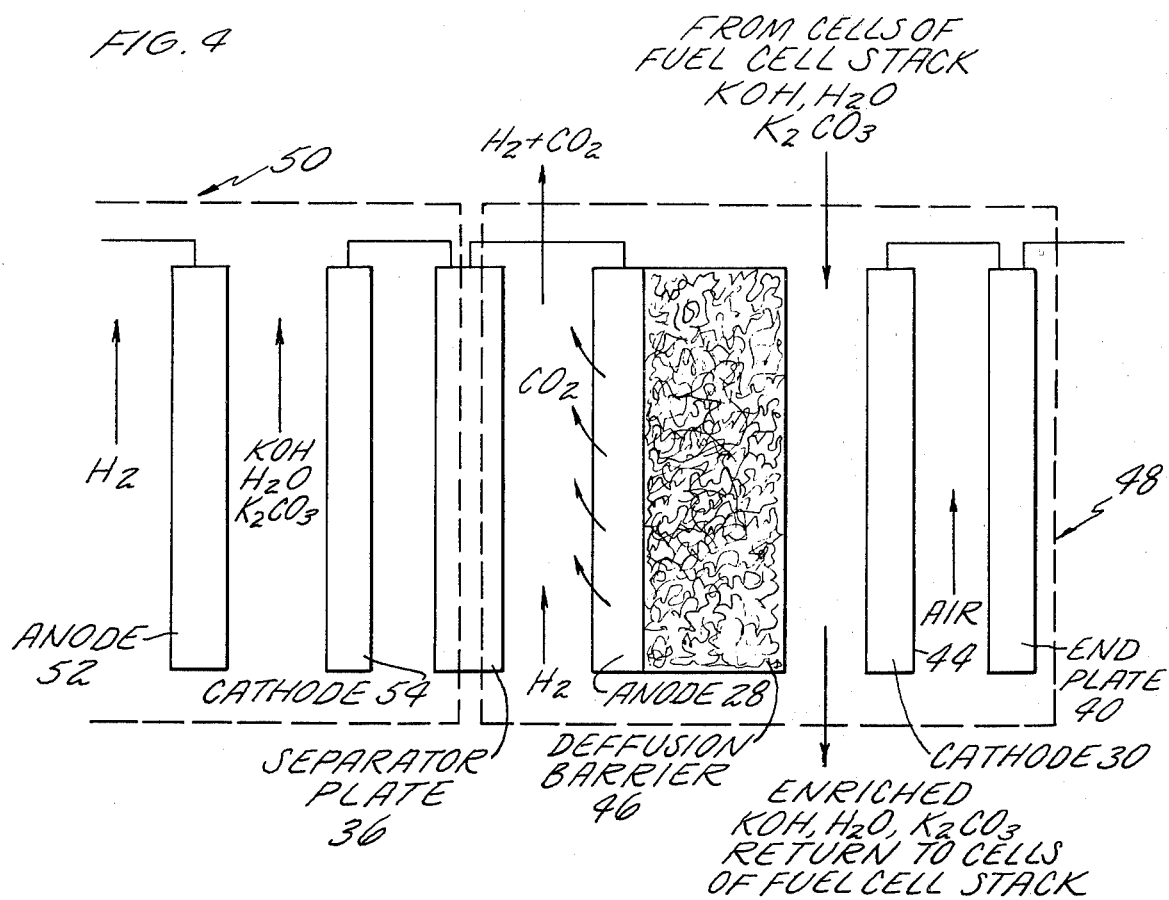

ELECTROLYTE REGENERATION IN A FUEL CELL STACK

This is a continuation of Ser. No. 272,501, filed July 17, 1972 now abandoned.

BACKGROUND OF THE INVENTION

1. Field of the Invention

This invention relates to fuel cell stacks which utilize a metal hydroxide electrolyte and more particularly to means for preventing a carbonate buildup in the cells thereof.

2. Description of the Prior Art

Cells of one type of a fuel cell stack are comprised of an electrolyte and porous electrodes. Hydrogen and oxygen are provided at the respective electrodes thereby causing a resulting fuel cell reaction which furnishes an electrical output to a load. The source of the oxygen may be ambient air which contains between 500–1000 parts per million of carbon dioxide ($CO_2$). The electrolyte is often an aqueous solution of an alkali metal hydroxide, such as potassium hydroxide (KOH). If $CO_2$ enters the cell, it reacts with the electrolyte to form an alkali metal carbonate. The carbonate typically causes a voltage loss. High carbonate ion concentration may also result in the formation of a precipitate which accumulates at the surfaces of the porous electrodes of cells, thereby reducing the efficiency and performance thereof.

In U.S. Pat. Nos. 3,511,712 and 3,519,488, Giner discloses a means for removing the carbonate ions from the electrolyte of a fuel cell, whereby the electrolyte is regenerated. Giner establishes a hydroxyl ion gradient between electrodes of a fuel cell, thereby causing a conversion of the carbonate ions to $CO_2$ and hydroxyl ions. Giner, however, requires the use of substantially pure hydrogen for obtaining the hydroxyl ion gradient. Additionally, a plurality of cells of the type disclosed by Giner may not, in some instances, be preferred in a fuel cell stack because a large hydroxyl ion gradient in each cell causes a large reduction of the voltage provided by the stack. Giner does not disclose how a single regenerator cell can be integrated with other cells of a fuel cell stack for regenerating the electrolyte of the entire stack.

Heretofore, an efficient, economical apparatus for regenerating the electrolyte of a fuel cell stack has been unknown in the prior art.

SUMMARY OF THE INVENTION

An object of the present invention is to provide fuel cells stacks which utilize an alkali metal hydroxide electrolyte.

Another object of the present invention is to regenerate an alkali metal hydroxide electrolyte of a fuel cell stack wherein carbonate ions are present due to ambient air in contact with the electrolyte.

According to the present invention, in a fuel cell stack which utilizes an alkali metal hydroxide electrolyte which contains carbonate ions due to the contact therewith of air containing carbon dioxide, the electrolyte is distributed in parallel between the electrodes of a plurality of fuel cells and thereupon to a regenerator cell wherein the carbonate ions are converted to carbon dioxide and hydroxyl ions by providing a substantial hydroxyl ion gradient between the electrodes of a regenerator cell and the regenerated electrolyte is then returned to the fuel cells.

In one specific embodiment of the present invention one electrolyte regenerator cell in a fuel cell stack regenerates the electrolyte within the stack. The regenerator cell removes carbonate formed in approximately 60 cells and is driven by less than one sixtieth of the voltage provided by the stack.

In another specific embodiment of the present invention, a regenerator cell within a fuel cell stack provides a voltage and regenerates the electrolyte within the stack. Common to both embodiments, the regenerator cell maintains a carbonate ion balance at a tolerably low concentration.

The present invention provides fuel cell stacks in which the electrolyte therein may be economically regenerated.

Other objects, features and advantages of the present invention will become more apparent in the light of the following detailed description of a preferred embodiment thereof as illustrated in the accompanying drawing.

BRIEF DESCRIPTION OF THE DRAWING

FIG. 3 is a schematic block diagram of a second embodiment of the present invention; and FIG. 4 is a schematic diagram of a regenerator cell used in the embodiment shown in FIG. 3.

DESCRIPTION OF THE PREFERRED EMBODIMENT

In each of two embodiments of the present invention, a fuel cell stack utilizes an aqueous solution of potassium hydroxide (KOH) for the electrolyte therein. Unscrubbed ambient air and hydrogen are provided at inlets to the stack and distributed through manifolds to the respective electrodes of each coil for causing a fuel cell reaction whereby an electrical output is provided. As is known to those skilled in the art, carbon dioxide ($CO_2$), which is included in the air, causes a reaction with the electrolyte which provides carbonate ions and water in accordance with a relationship given as:

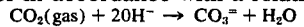
$$CO_2(gas) + 2OH^- \rightarrow CO_3^= + H_2O$$

A first embodiment of the invention is predicated upon a fuel cell stack which includes a regenerator cell which requires a drive voltage of typically from 0.4 to 0.8 volts. Reformed natural gas, which includes hydrogen, is provided to the stack. The driven regenerator cell converts the carbonate ions (formed by the contact of the air with the electrolyte) into $CO_2$ and hydroxyl ions thereby maintaining the carbonate ion concentration tolerably low in a stack comprised of approximately 60 fuel cells. The driven regenerator cell requires a drive voltage of less than one sixtieth of the stack output voltage.

A second embodiment of the invention is predicted upon a fuel cell stack which includes a regenerator cell that provides an output in the range of .1 to .4 volts. Substantially pure hydrogen is provided to the stack. The output regenerator cell (in a manner similar to the driven regenerator cell) regenerates the electrolyte by converting the carbonate ions into $CO_2$ and hydroxyl ions in a stack comprised of approximately 60 cells.

In both embodiments, the rate of formation of carbonate ions is proportional to the current through the load. The rate of conversion of the carbonate ions is also proportional to the current through the load. A carbonate ion balance is established within the cells such that the $CO_2$ converted from the carbonate ions equals the $CO_2$ reacted with the electrolyte.

Figure 1:
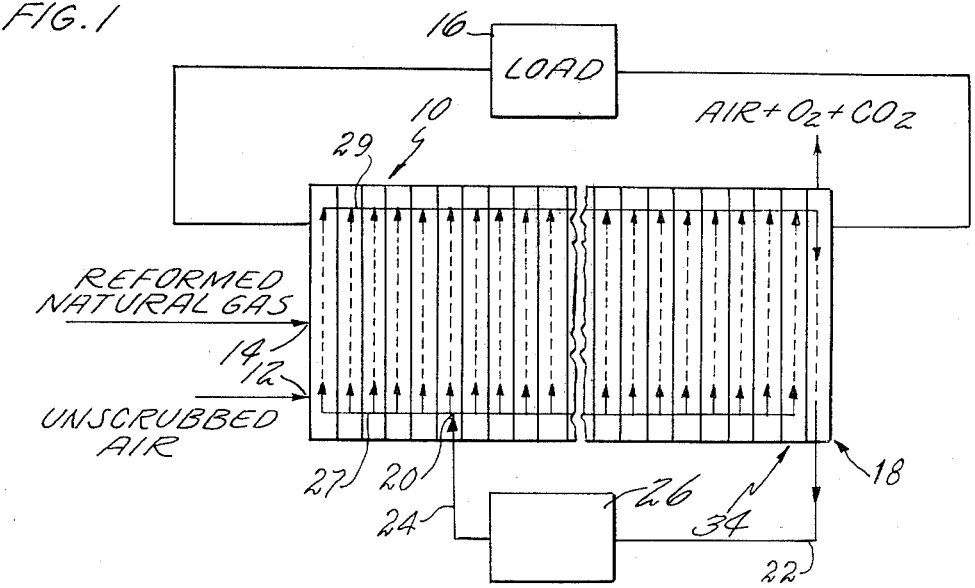
FIG. 1 is a schematic block diagram of a first embodiment of the present invention.

Referring now to FIG. 1, in the first embodiment of the present invention, unscrubbed ambient air and reformed natural gas (referred to hereinafter as reactant gases) are respectively introduced into a fuel cell stack 10 through inlet ports 12, 14. A load 16 is connected across the series connected cells of the stack 10. The air and the natural gas respectively provide the oxygen for the cathodes of the cells and the hydrogen for the anodes of the cells for causing a fuel cell reaction (apparatus for providing the reformed natural gas and the air to the inlet ports 12, 14 is not shown). The fuel cell reaction (apparatus for providing the reformed natural gas and the air to the inlet ports 12, 14 is not shown). The fuel cell reaction results in a load voltage being provided to the load 16.

A regenerator cell 18 is disposed at one end of the stack 10. The electrolyte in the stack 10, which is circulated through the cell 18, has the tolerably low concentration of carbonate ions maintained therein in a manner described hereinafter. The electrolyte is circulated from the regenerator cell 18 to an electrolyte inlet port 20 of the stack 10 via conduits 22, 24 and a pump 26. The electrolyte is distributed in parallel to each of the fuel cells via internal manifolds 27, 29.

Figure 2:
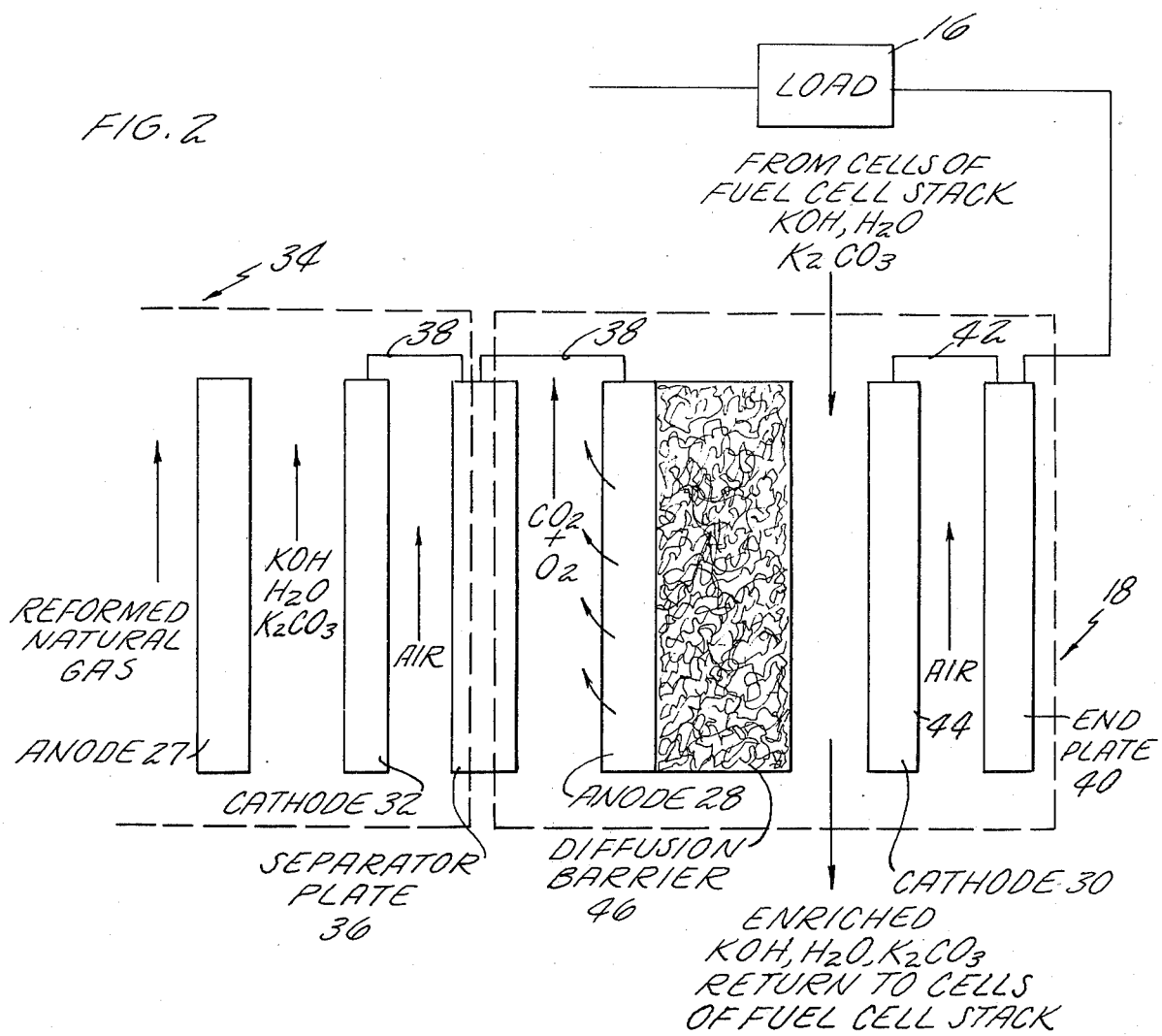
FIG. 2 is a schematic diagram of a regenerator cell used in the embodiment shown in FIG. 1.

Referring now to FIG. 2, the regenerator cell 18 is comprised of an anode electrode 28 and a cathode electrode 30. The anode 28 is electrically connected to the cathode 32 of an adjacent fuel cell 34. The electrical connection is through a separator plate 36 which has ribs (not shown) in contact with the electrodes 28, 32. The ribs are schematically represented by signal lines 38. The cathode 30 is connected to the load 16 through the ribs of an end plate 40 which are schematically represented by the signal line 42. The electrodes 28, 30, which are typical of those used in fuel cells, are both porous and have a catalyst on the surface thereof. As shown, the electrolyte passes between and in contact with both the anode and the cathode electrode. Air is provided to the regenerator cell 18 on the side 44 of the cathode 30. The oxygen in the air reacts at an electrolyte-catalyst interface of the cathode 30, causing an enhancement of the hydroxyl ion concentration in accordance with the relationship as:

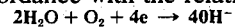

where 4e is indicative of four electrons provided from the load 16. At the catalyst-electrolyte interface of the anode 28, a depletion of the hydroxyl ion concentration in a hydroxyl ion depletion reaction is in accordance with the relationship given as:

where the 4e is indicative of the electrons provided to the cathode 32 by the anode 28. Oxygen is released by the reaction at the anode 28, evolved from the regenerator cell 18 and then vented to the outside of the stack 10 by purging or any other suitable means.

According to the present invention, the depletion of the hydroxyl ion concentration at the catalyst-electrolyte interface of the anode 28 also causes a regenerating reaction in accordance with a relationship given as:

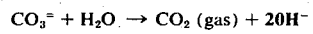

$CO_2$ is released in the regenerating reaction at the anode 28 and is evolved therefrom simultaneously with the oxygen released by the depletion reaction. The $CO_2$ and oxygen are both vented to the outside of the stack 10 by purging or any otehr suitable means.

A rapid migration of the hydroxyl ions from the catalyst-electrolyte interface of the cathode 30 (where there is an enhancement of hydroxyl ions) to the catalyst-electrolyte interface of the anode 28 (where there is a depletion of hydrogen ions) would cause hydroxyl ions to be provided from one interface to the other without providing the regenerating reaction. A diffusion barrier 46 disposed between electrodes 28, 30 impedes the migration of hydroxyl ions to the anode thereby maintaining a hydroxyl ion gradient between the electrodes 28, 30.

Diffusion barriers, which are well known in the art, are typically made from several layers of a fibrous asbestos mat or of porous or fibrous plastic. Alternatively, the electrodes 28, 30 may have a smaller catalyst-electrolyte interface area than the other cells of the stack 10 (FIG. 1). A higher current density is caused by the smaller area thereby providing the hydroxyl ion gradient and the regeneration of the electrolyte as described hereinbefore.

Since the reformed natural gas (provided at the inlet of the port 14) may contain a very high concentration of $CO_2$, the anode of the cells (other than the regenerator cell 18) of the stack 10 are coated with a hydrogen diffusion membrane typically made from palladium silver. The membrane permits only hydrogen to pass to the catalyst-electrolyte interface for the fuel cell reaction; the pores of the membrane are sufficiently small to prevent the passage therethrough of $CO_2$ and oxygen. The membrane is not used on the anode of the cell 18 since both oxygen and $CO_2$ are evolved therefrom.

In alternative embodiments where the natural gas has been processed to remove most of the carbon oxides, the diffusion membrane is not used; the processed natural gas is fed directly to the anodes of the fuel cells. A plurality of regenerator cells may be included in the stack 10 to maintain a carbonate ion balance that provides the tolerably low carbonate ion concentration.

Thus, there has been shown a driven regenerator cell included in a fuel cell stack which is driven by cells of the stack for regenerating the electrolyte therein. Driven regenerator cells are particularly suited (but not limited) for use in fuel cells where reformed natural gas provides the hydrogen for the fuel cell reaction.

Although a driven regenerator cell has been shown as an integral part of the fuel cell stack, driven regenerator cells may be provided as individually operable units. It should be understood that the individually operable regenerator cell requires only air (no hydrogen is required for regenerating the electrolyte) thus having an advantage of component simplicity.

Referring now to FIG. 3, in a second embodiment of the present invention, unscrubbed air and substantially pure hydrogen are the reactants respectively received through the inlet ports, 12, 14. A regenerator cell 48 comprises one end of the stack 10. The regenerator cell 48 receives electrolyte (containing carbonate ions) from the other cells of the stack 10 and regenerates the electrolyte by removing the carbonate ions in a manner described hereinafter.

Referring now to FIG. 4, the regenerator cell 48 is of substantially the same structure as the regenerator cell 18 (FIG. 2). A cell 50 (typical of the cells of the stack 10) is disposed adjacent to the cell 48. As shown, the electrolyte passes between and in contact with both the anode and the cathode electrode. Since substantially pure hydrogen is provided to the stack 10, the anode 52 of the cell 50 does not have the hydrogen diffusion membrane described hereinbefore; the cathode 54 of the cell 50 is identical in structure to the cathode 32. Therefore, only the diffusion barrier 46 between the electrodes 28, 32 distinguishes the regenerator cell 48 and all other cells of this stack 10. In alternative embodiments the cell 48 may utilize a high current density between the electrodes 28, 32 as described hereinbefore.

In the cell 48, hydrogen and air are respectively provided to the sides 43, 44 of the electrodes 28, 30. The hydrogen reacts at the catalyst-electrolyte interface of the anode 28 causing a depletion of the hydroxyl ions in accordance with a relationship given as:

$$H_2 + 2OH^- \rightarrow 2H_2O + 2e$$

The oxygen in the air reacts at the catalyst-electrolyte interface of the cathode 30 where hydroxyl ions are provided in accordance with a relationship given as:

$$2H_2O + O_2 + 2e^- \rightarrow 2OH^-$$

Because of the depletion of the hydroxyl ion concentration of the interface of the anode 28, the regenerating reaction takes place as explained hereinbefore. The $CO_2$ released in the regenerating reaction may be purged to the outside of the stack 10 by an excess of hydrogen provided between the separator plate 36 and the anode 28 or may be vented in any other suitable manner.

The substantial gradient in the hydroxyl ion concentration between the electrodes 28, 30 (which is not present in any other cells of the stack 10 because of the absence therein of the diffusion barrier) causes a gradient in the pH of the electrolyte therebetween. The difference in the output voltage of the regenerator cell 48 from the other cells of stack 10 is in accordance with the well known Nernst equation, which, at an ambient temperature of 200° F (a typical stack temperature), is given as:

$$\Delta E = .073 \, (pH_c - pH_a)$$

where $pH_c$ is the pH at the cathode 30;
$pH_a$ is the pH at the anode 28; and
$\Delta E$ is the difference in the output voltage.

Therefore, although the cells of the stack 10 usually provide 0.9 volts, a pH gradient sufficient to cause the release of $CO_2$ causes the regenerator cell 48 to typically provide from 0.3 to 0.7 volts.

Circulation of the electrolyte through the stack 10 is in parallel via the manifolds 51, 53 in the manner of the embodiment of FIG. 1.

Although the invention has been shown and described with respect to preferred embodiments thereof, it should be understood by those skilled in the art that various changes and omissions in the detail thereof may be made therein without departing from the spirit and the scope of the invention.

Having thus described typical embodiments of my invention, that which I claim as new and desire to secure by Letters Patent of the United States is:

1. In the operation of fuel cell apparatus including a plurality of fuel cells electrically connected in series to each other and to a load, each of said cells comprising a fuel electrode and an oxidant electrode spaced apart and utilizing an alkali metal hydroxide as the electrolyte, a hydrogen containing gas as the fuel, and unscrubbed air directly in the fuel cell electrodes as the oxidant, each electrode including a catalyst-electrolyte interface therein, wherein detrimental carbonate ions are formed in the electrolyte by reaction of the electrolyte with the carbon dioxide present in the air, the process comprising the steps of:

providing a regenerator cell connected electrically in series with said fuel cells and responsive to the power demand of the load, the regenerator cell comprising a cathode electrode and an anode electrode spaced apart;

circulating the electrolyte in a single pass through the fuel cells and into contact with both the fuel and oxidant electrodes of said cells during said pass and then between said electrodes of the regenerator cell, wherein the step of circulating the electrolyte through the fuel cells includes the step of distributing said electrolyte in parallel to each of the fuel cells between the electrodes thereof;

flowing unscrubbed air past and in contact with the nonelectrolyte side of said regenerator cell cathode electrode;

establishing and maintaining a hydroxyl ion gradient in the regenerator cell between the regenerator cell electrodes, the hydroxyl ion concentration in the electrolyte at the anode electrode being sufficiently low to effect the release of gaseous carbon dioxide from the electrolyte at a steady state rate essentially equivalent to its rate of absorption in the electrolyte in the fuel cells as a function of the power demand of the load; and venting the carbon dioxide from the stack.

2. The process of claim 1 including the step of flowing substantially pure hydrogen in contact with the nonelectrolyte side of said regenerator cell anode electrode.

3. The process of claim 2 wherein said hydrogen containing gas is substantially pure hydrogen.

4. The process of claim 1 wherein the step of providing a regenerator cell includes providing a regenerator cell integral with said fuel cells.

5. The process of claim 1 wherein said fuel cell fuel electrodes include a hydrogen diffusion membrane permitting only hydrogen to pass to the catalyst-electrolyte interface, the hydrogen containing gas is reformed natural gas, and the regenerator cell is driven solely by the power output of the fuel cells.

6. A fuel cell apparatus comprising a plurality of cells electrically connected in series to form a cell stack, each of the cells of said cell stack including a pair of spaced apart electrodes one being an anode electrode and the other being a cathode electrode and each having a catalyst-electrolyte interface therein, the cells of said cell stack being divided into two groups, means providing alkali metal hydroxide electrolyte circulation from one group to the other, the first of said groups consisting of a plurality of fuel cells, said apparatus including means to distribute said electrolyte in parallel between each pair of electrodes of said first group in a single pass, said first group of cells having hydrogen containing gas passing on the nonelectrolyte side of each anode electrode and unscrubbed air passing on the nonelectrolyte side of each cathode electrode, the second group of said cells consisting of one or more regenerator cells, means for flowing said circulating electrolyte between the regenerator cell electrodes and means for flowing unscrubbed air past and in contact with the nonelectrolyte side of said regenerator cell cathode electrode, each regenerator cell including a diffusion barrier disposed adjacent the electrolyte side of said anode electrode thereof for maintaining a hydroxyl ion gradient in said regenerator cell between said anode electrode and said cathode electrode wherein gaseous carbon dioxide is released from the electrolyte at the anode electrode thereof, wherein only the cells of said second group of cells include a diffusion barrier, and means for venting said carbon dioxide released from the electrolyte from said fuel cell apparatus.

7. The fuel cell apparatus according to claim 6 wherein said hydrogen containing gas is reformed natural gas and each of said anode electrodes of said first group of cells includes a hydrogen diffusion membrane permitting only hydrogen to pass to the catalyst-electrolyte interface thereof and wherein said second group of cells is driven solely by the power output of said first group of cells.

8. The fuel cell apparatus according to claim 6 wherein each of said second group of cells includes substantially pure hydrogen flowing past the nonelectrolyte side of said anode electrodes thereof.

9. The fuel cell apparatus according to claim 8 wherein said hydrogen-containing gas is substantially pure hydrogen.

* * * * *

UNITED STATES PATENT OFFICE
CERTIFICATE OF CORRECTION

PATENT NO. : 3,990,912
DATED : Nov. 9, 1976
INVENTOR(S) : Murray Katz

It is certified that error appears in the above-identified patent and that said Letters Patent are hereby corrected as shown below:

Column 2, line 42: "coil" should read --cell--

Column 2, line 61: "predicted" should read --predicated--

Column 3, lines 18-21: delete "The fuel ... not shown)."

Column 4, line 5: "otehr" should read --other--

Signed and Sealed this

Eleventh Day of January 1977

[SEAL]

Attest:

RUTH C. MASON
*Attesting Officer*

C. MARSHALL DANN
*Commissioner of Patents and Trademarks*